O. B. DEES & P. F. McINTOSH.
SKIMMER FOR MAKING SYRUP.
APPLICATION FILED OCT. 27, 1911.
1,077,331.
Patented Nov. 4, 1913.
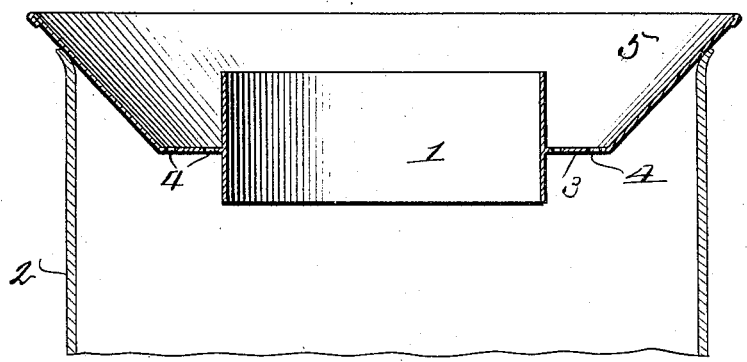
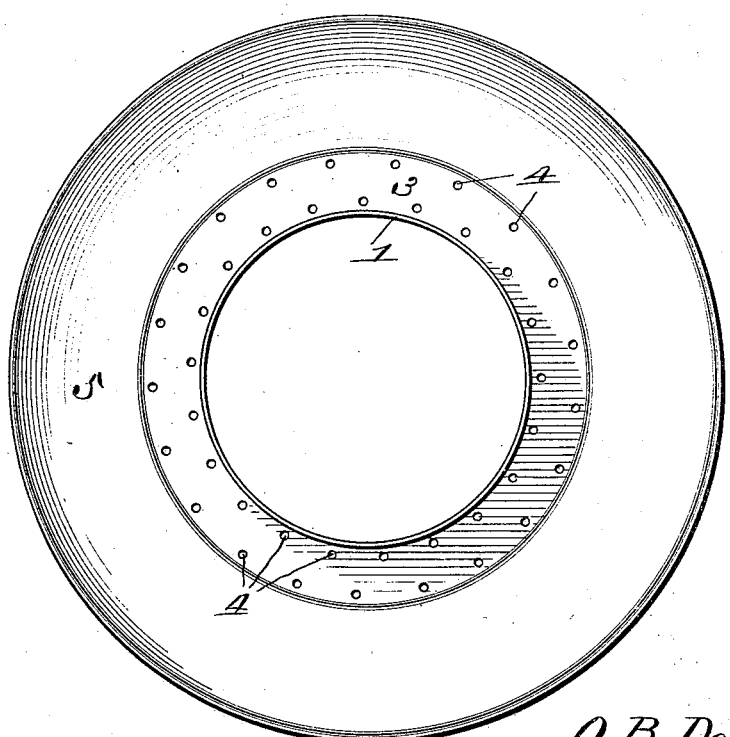

UNITED STATES PATENT OFFICE.

OTIS B. DEES AND PAUL F. McINTOSH, OF MAYO, FLORIDA.

SKIMMER FOR MAKING SYRUP.

1,077,331.  Specification of Letters Patent.  Patented Nov. 4, 1913.

Application filed October 27, 1911. Serial No. 657,055.

*To all whom it may concern:*

Be it known that we, OTIS B. DEES and PAUL F. McINTOSH, citizens of the United States, residing at Mayo, in the county of Lafayette and State of Florida, have invented a new and useful Improvement in Skimmers for Making Syrup, of which the following is a specification.

This invention relates to a device for automatically skimming syrups and other liquids, which when boiled require removing from the boiling surface certain parts of the material which it is not desired to retain in the clear syrup.

The invention consists of the novel features of construction hereinafter fully described, pointed out in the claim and shown in the accompanying drawings, in which, Figure 1 is a vertical cross section through the device, in position for use. Fig. 2 is a plan view of the same.

In these drawings, 1 represents a cylinder open at each end and of considerably less diameter than the kettle 2 in which the device is adapted to be used. The cylinder 1 carries intermediate its ends a laterally extending flange 3, which is provided with a plurality of perforations 4. The flange 3 is provided with an integral upwardly and outwardly extending rim 5, which is adapted to rest upon the upper edge of the kettle and support the cylinder 1, centrally within the kettle. The rim 5 is also preferably higher than the upper edge of the cylinder 1, and prevents any of the boiling syrup from overflowing or boiling out of the kettle or strainer.

In operation the liquid will boil up through the cylinder 1 and will overflow into the combined strainer and skimmer formed by the flange 3 and the rim 5, the clear syrup or juice flowing back into the kettle through the perforations 4 while the refuse matter is collected and held in the receptacle formed circumferentially around the cylinder 1 by the flange 3 and the rim 5.

What we claim is:

A syrup skimmer comprising a cylinder open at each end, and an annular receptacle carried by said cylinder, and secured to the cylinder midway the ends of the cylinder, said receptacle having a perforated bottom, and being adapted to rest upon the top of a kettle and support the said cylinder centrally within the upper portion of said kettle.

OTIS B. DEES.
PAUL F. McINTOSH.

Witnesses:
T. J. WEAVER,
L. L. RANNEY.